Aug. 19, 1941.   C. C. PETERSON   2,253,249
WIPER BLADE
Filed Sept. 7, 1939
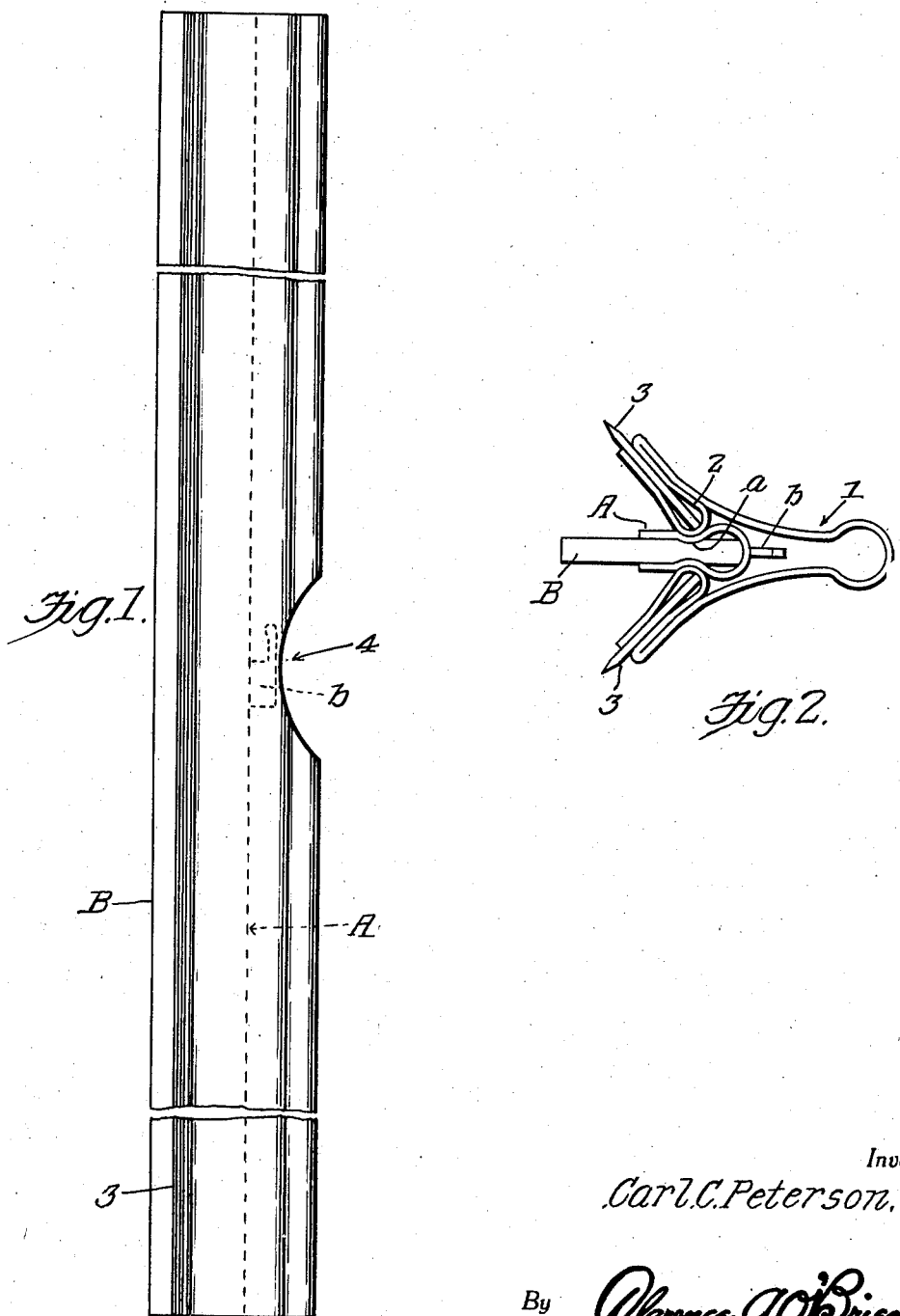
Inventor
Carl C. Peterson,
By Clarence A. O'Brien
and Hyman Berman
Attorneys Patented Aug. 19, 1941

2,253,249

UNITED STATES PATENT OFFICE 2,253,249

WIPER BLADE

Carl Christen Peterson, Woburn, Mass., assignor of thirty per cent to Carl H. Petersen, Saugus, Mass.

Application September 7, 1939, Serial No. 293,815

1 Claim. (Cl. 15—250)

This invention relates to an attachment for a wiper blade, such as used on a windshield, the general object of the invention being to provide means for associating blades with the wiper so that the blades will remove ice and snow from the windshield as the wiper is moving over the same.

This invention also consists in certain other features of construction and in the combination and arrangement of the several parts to be hereianfter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is an elevation of a wiper provided with the invention.

Figure 2 is an end view of Figure 1.

In these views the letter A indicates the holder of the wiper which is of substantially U-shape in cross section and B indicates the rubber member of the wiper which is clamped between the limbs of the holder, said limbs being formed with the inwardly depressed parts $a$ for increasing the clamping action of the limbs on the rubber member.

In carrying out my invention I provide an elongated member 1 which is of substantially U-shape in cross section with the ends of the limbs thereof bent inwardly to provide the small U-shape loops 2 for holding the blades 3. Each loop 2 has one limb thereof contacting the inner face of a limb portion of the member 1 and the bights of these loops 2 engage the depressions $a$ so that the member 1 yieldingly grips the holder A of the wiper and thus the member 1 is held on the holder of the wiper. The member 1 is formed of spring metal and its limbs are slightly bowed outwardly and the inherent resiliency of the parts causes the bights of the loops 2 to engage the depressions to firmly connect the device with the holder of the wiper. As shown the rubber member B has its outer edge projecting beyond the plane of the cutting edges of the blades 3 so that when the device is in inoperative position the rubber member will contact the glass of a windshield or other member with which the wiper is associated and the blades will be out of contact with the glass. However, when the device is in operation the pressure applied to the wiper by the spring arm will cause the rubber member to bend first to one side and then the other as the wiper oscillates across the glass and then a blade will contact the glass so as to cut snow, ice or other foreign matter from the glass with a scraping and cutting action and the blade is followed by the wiper so that the loose matter scraped and cut by the blade will be removed by the rubber of the wiper.

The bight of the member 1 is formed with a centrally arranged notch 4 for the passage of the arm which is connected with the member $b$ of the holder A in the usual manner. As shown in the drawing the device 1 can be readily removed from the wiper by an end sliding motion or by spreading the limbs of the member 1 apart a sufficient distance to permit the bights of the loops 2 to clear the holder.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A blade holding attachment for a windshield wiper comprising a member of elongated form and of spring sheet metal and of substantially U-shape in cross section to provide a bight and a pair of limbs, edge portions of the limbs being bent inwardly to form a pair of blade holders which are located in the space between the limbs and each holder being of U-shape in cross section with one limb of each holder contacting the inner face of the adjacent limb of the member and metal blades held by the holders with the cutting edges projecting from the holders, said attachment being adapted to be placed over a windshield wiper with bight portions of the blade holders gripping a part of the wiper between them and the blades and holders diverging outwardly from said part of the wiper.

CARL CHRISTEN PETERSON.